United States Patent
Krätschmer et al.

(10) Patent No.: US 8,529,693 B2
(45) Date of Patent: Sep. 10, 2013

(54) ADHESIVE STRENGTH ENHANCERS FOR CEMENTITIOUS COMPOSITIONS

(75) Inventors: Gerald Krätschmer, Sieghartskirchen (AU); Jörg Thomas Wilken, Hannover (DE)

(73) Assignee: Troy Corporation, Florham Park, NJ (US)

( * ) Notice: Subject to any disclaimer, the term of this patent is extended or adjusted under 35 U.S.C. 154(b) by 159 days.

(21) Appl. No.: 12/928,393

(22) Filed: Dec. 10, 2010

(65) Prior Publication Data

US 2012/0148826 A1 Jun. 14, 2012

(51) Int. Cl.

| | |
|---|---|
| C09D 11/00 | (2006.01) |
| B32B 5/16 | (2006.01) |
| B32B 9/00 | (2006.01) |
| B32B 15/02 | (2006.01) |
| B32B 17/02 | (2006.01) |
| B32B 19/00 | (2006.01) |
| B32B 21/02 | (2006.01) |
| B32B 23/02 | (2006.01) |
| B32B 27/02 | (2006.01) |
| B01F 3/00 | (2006.01) |
| B01F 17/00 | (2006.01) |
| B01J 13/00 | (2006.01) |
| C09K 3/00 | (2006.01) |
| B05D 7/00 | (2006.01) |
| C11D 3/37 | (2006.01) |
| C11D 7/60 | (2006.01) |
| C11D 17/00 | (2006.01) |
| C11D 17/08 | (2006.01) |
| C07C 323/25 | (2006.01) |
| C04B 7/00 | (2006.01) |
| C04B 16/00 | (2006.01) |
| C04B 24/00 | (2006.01) |
| C04B 9/04 | (2006.01) |
| C04B 11/00 | (2006.01) |
| C04B 28/14 | (2006.01) |
| C04B 14/00 | (2006.01) |
| C04B 14/04 | (2006.01) |
| C09C 1/02 | (2006.01) |
| C09B 48/00 | (2006.01) |

(52) U.S. Cl.
USPC ........... 106/809; 106/725; 106/781; 106/465; 106/470; 106/487; 106/491; 516/9; 427/220; 510/274; 510/268; 510/349; 510/438; 510/492; 252/363.5; 428/403

(58) Field of Classification Search
USPC ................ 427/220; 510/268, 274, 349, 492; 252/363.5
See application file for complete search history.

(56) References Cited

U.S. PATENT DOCUMENTS

| | | | |
|---|---|---|---|
| 2,028,091 | A | 1/1936 | Jaeger |
| 2,969,332 | A | 1/1961 | Lawler et al. |
| 3,250,624 | A | 5/1966 | Van Ness |
| 4,746,382 | A | 5/1988 | Logan |
| 5,173,117 | A | 12/1992 | Inokawa et al. |
| 5,185,134 | A | 2/1993 | Gullett |
| 5,512,211 | A | 4/1996 | McSwigan et al. |
| 5,733,365 | A * | 3/1998 | Halko et al. .................. 106/437 |
| 5,830,841 | A | 11/1998 | Surutzidis et al. |
| 6,172,147 | B1 | 1/2001 | Abelleira |
| 6,692,565 | B2 * | 2/2004 | Johansen et al. .............. 106/712 |
| 7,204,065 | B2 | 4/2007 | Naji |
| 2002/0062006 | A1 * | 5/2002 | Sandor et al. ................. 528/480 |
| 2010/0028692 | A1 | 2/2010 | Hedouin et al. |

FOREIGN PATENT DOCUMENTS

| | | |
|---|---|---|
| CA | 491099 B2 | 3/1953 |
| JP | 2006232651 A | 9/2006 |

* cited by examiner

*Primary Examiner* — Anthony J Green
*Assistant Examiner* — Karam Hijji
(74) *Attorney, Agent, or Firm* — Robert A. Yesukevich

(57) ABSTRACT

An adhesion bond strength enhancer for cementitious adhesive mortar is disclosed. The adhesion enhancer improves bond strength between the mortar and relatively hydrophobic plastic material, such as extruded polystyrene boards and expanded polystyrene boards of the type generally employed in Exterior Insulation Finishing Systems ("EIFS"). Preparation of non-caking, free-flowing, solid dialkyl sulfosuccinate compositions for use as the adhesion enhancer is also disclosed. The adhesion enhancer is attractive for large-scale application in mineral mortar dry-mixes or other solid construction materials. The invention can be used to improve the strength of an adhesive bond between a) gypsum based plaster or stucco and concrete or bricks, b) tile adhesives and concrete, and c) mineral mortars on polystyrene boards, among others.

24 Claims, No Drawings

ADHESIVE STRENGTH ENHANCERS FOR CEMENTITIOUS COMPOSITIONS

BACKGROUND OF THE INVENTION

1. Field of the Invention

The present invention relates to compositions of matter and methods for increasing the cured adhesion strength, hardness and workability of cementitious compositions, such as masonry cements and mortars.

2. Description of the Related Art

Masonry cements and mortars are hydraulic-setting compositions produced particularly for use in bonding of bricks, blocks, and the various components of exterior insulation finishing systems (hereinafter referred to as "EIFS"). Such cements are typically mixed prior to use with a fine aggregate and water. It is desirable that the wet mortar have a high degree of plasticity for working by hand, as well as a relatively a long working time before the cement hardens.

Masonry cements and mortars are produced by grinding Portland cement and gypsum with from about 20 to 65%, of a third material such as limestone, chalk, talc, pozzolans, clay, gypsum, or combinations of such. Portland cement is a type of cement which includes calcined oxides of calcium, aluminum, iron and silicon and is capable of solidifying under water. Such masonry cements are ground to a greater degree of fineness than most Portland cements intended for use in structural concretes. The finer grind of masonry cements improves the plasticity of the finished mortar products.

"Exterior insulation finishing system" or "EIFS" means any one of a number of unique proprietary systems, each of which may consist of specific components associated with a particular EIFS producer. One basic type of EIFS, known as "barrier EIFS", includes boardstock insulation, reinforced adhesive, and exterior coating arranged in three layers. A less common type of EIFS, known as "drainage EIFS", may additionally include plastic edge trim, water-resistive barriers, and water drainage cavities. The boardstock is typically expanded polystyrene or extruded polystyrene. One of the persistent problems in EIFS construction is creating a durable and economical adhesive bond between masonry mortar and polystyrene.

The most interior of the three barrier EIFS layers is typically a layer of foam plastic insulation commercially available in the form of polystyrene boardstock. The inner face of the polystyrene boardstock directly contacts a base adhesive (which may be a masonry mortar) and receives mechanical fasteners, such as nails or plugs.

An intermediate adhesive filler layer (which may be a masonry mortar) is applied on the outer face of the polystyrene boardstock insulation, typically by means of a trowel. The adhesive filler layer substantially surrounds and fills a reinforcing mesh, which is embedded in the adhesive filler layer. The mesh is typically made of fiberglass and has openings of about one-quarter inch square. Significantly, preparing the adhesive filler, applying the adhesive filler layer to the outer face of the polystyrene boardstock, and embedding the mesh in the adhesive filler layer are generally considered to be demanding and time-consuming tasks for skilled craftsmen.

The most exterior of the three layers is a called a topcoat. It is normally a colored and textured paint-like material (which may be a masonry mortar) that is applied with a trowel or, less frequently, by spraying. A wide range of colors and textures are available for the topcoat. Available textures include smooth surfaces, rough stucco-like textures, embedded stone chips, granite-like mixtures and brick-like treatments.

U.S. Pat. No. 6,172,147, issued to Abelleira, describes a masonry mortar additive that contains a multi-stage polymer which includes an ionically-soluble polymer stage, and an air entraining agent. The '147 patent lists many exemplary air-entraining agents (referred to collectively in the '147 patent as "AEAs") as suitable for use in the masonry mortar additive. Among these, listed at Column 4, lines 3-5 of the '147 patent, are anionic AEAs such as sulfosuccinates. In contrast, a spray-dried dialkyl sulfosuccinate salt composition of the present invention acts as a deaerating agent upon mixing with a mineral mortar and water (as set forth below in Example 8).

U.S. Pat. No. 7,204,065, issued to Naji, describes a method for applying a cementitious formulation to a substrate, such as polystyrene, over a confining mesh attached to the substrate. In certain aspects, such as an aspect claimed in Claim 25 of the '065 patent, the formulation reportedly includes an air entraining agent (referred to collectively in the '065 patent as "AEAs"). Among these, listed at Column 6, lines 56-59 of the '065 patent, are anionic AEAs such as sulfosuccinates. In contrast, a spray-dried dialkyl sulfosuccinate salt composition of the present invention acts as a deaerating agent upon mixing with a mineral mortar and water (as set forth below in Example 8).

Canadian Patent 491099, issued to Vitalis, describes surface-active dialkyl sulfosuccinates compositions that are prepared in the form of dry, non-caking water-soluble powders by spray-drying with sodium benzoate as a hardener at 600-700 degrees F. However, the '099 patent compositions are not panaceas and may yet be improved upon because, among other reasons, they contain sodium benzoate. One objection to the '099 patent compositions is that sodium benzoate absorbs water in humid atmospheres, and caking and clumping may be expected if the ambient humidity exceeds 50%. Another objection to the '099 patent compositions is that sodium benzoate has been associated with skin and eye irritation in dry atmospheres.

A need exists for an improved solid surfactant that flows freely under humid atmospheric conditions and dissolves quickly in water. Preferably, the new solid surfactant will strengthen adhesive bonding between masonry mortars and smooth, hydrophobic surfaces such as those used in EIFS. Ideally, the new solid surfactant will increase the hardness and reduce the water uptake of masonry cements and mortars.

SUMMARY OF THE INVENTION

It has now been discovered that certain additives, herein referred to as adhesion enhancers, can be utilized in cement-based mortars to improve adhesive bond strength between the mortars and relatively hydrophobic plastic materials, such as polystyrene. The adhesion enhancers additives may be broadly categorized as surfactant agents, and include dialkyl sulfosuccinates and their salts. The adhesion enhancers of the invention are free-flowing solid compositions. Processes for preparing and using the free-flowing, solid adhesion enhancers are described below.

In one aspect, the invention is a free-flowing solid surfactant composition that includes a surfactant and carrier particles. The surfactant may be one or more alkyl sulfosuccinates, one or more salts of alkyl sulfosuccinates, or a mixture of these. The carrier particles are composed of an absorbent calcium carbonate, calcium silicate, silicon dioxide, kaolin, or mixtures of these. The carrier particles have a mean average particle size of about 0.1 to about 1000 micrometers, and a capacity for carrying an amount by weight of the surfactant that is preferably about 0.2 to about 5 times the weight of the carrier particles.

In another aspect, the invention is a free-flowing solid surfactant composition that includes about 30 to about 75 weight percent of a surfactant composed of alkyl sulfosuccinates, salts of dialkyl sulfosuccinates, or mixtures of these. The composition also includes about 10 to about 75 weight percent of carrier particles which are composed of an absorbent material selected from the group consisting of calcium carbonate, calcium silicate, silicon dioxide, kaolin, or mixtures of these. The carrier particles have a mean average particle size of about 1 to about 160 micrometers, and the capacity to absorb an amount by weight of the surfactant that is about 0.2 to about 4 times the weight of the carrier particles. In addition, the composition includes about 1 to about 10 weight percent of an anticaking agent.

In yet another aspect, the invention is a dry-mix mortar composition including a dry-mix, hydraulic-setting mortar or cement, a solid surfactant composition as described above, and an anticaking composition.

The invention is also a process for manufacturing a free-flowing solid surfactant composition. The process includes introducing a surfactant selected from the group consisting of alkyl sulfosuccinates, salts of alkyl sulfosuccinates, and mixtures thereof into an absorption zone. Carrier particles are also introduced into the absorption zone. The carrier particles are composed of an absorbent material selected from the group consisting of calcium carbonate, calcium silicate, silicon dioxide, kaolin and mixtures thereof; have a mean average particle size of about 0.1 to about 1000 micrometers; and have a capacity for carrying an amount by weight of the surfactant that is about 0.2 to about 5 times the weight of the carrier particles. The surfactant and the carrier particles are maintained in the absorption zone at conditions effective for absorption of the surfactant by the carrier particles to produce solid surfactant particles. An anticaking agent is optionally mixed with the solid surfactant particles to produce a free-flowing solid surfactant composition.

In still another aspect, the invention is a process for manufacturing a free-flowing solid surfactant composition by spray-drying a liquid solution including a surfactant selected from the group of dialkyl sulfosuccinates and salts thereof in the presence of carrier particles, and optionally anti-caking agents, to produce a free-flowing solid surfactant composition. A defoamer, a non-ionic surfactant, or both maybe blended with liquid solution The invention is also a process for forming an adhesive bond between a mortar composition and an article composed of a polymer plastic material. The process involves providing a mortar composition that includes a solid surfactant composition as described above, and establishing and maintaining physical contact between the cement composition and an article composed of a polymer plastic material at conditions effective for curing of the mortar composition.

The invention provides an adhesive strength enhancer for hydraulic setting materials. For example, the invention can be used to improve the strength of an adhesive bond between a) gypsum based plaster or stucco and concrete or bricks, b) tile adhesives and concrete, and c) mineral mortars on polystyrene boards.

DETAILED DESCRIPTION OF PREFERRED
ASPECTS OF THE INVENTION

In a preferred embodiment, the invention is a free-flowing solid surfactant composition that is useful as an adhesion enhancer for cementitious mortars and that includes a surfactant and carrier particles. Because the construction industry is well equipped to handle pre-mixed mortars and cements that arrive at a job site in powder form, the free-flowing quality of this adhesion enhancer is highly desirable.

The surfactant includes one or more alkyl sulfosuccinates, and/or one or more salts of alkyl sulfosuccinates. Preferably, the alkyl sulfosuccinates and the salts are dialkyl, more preferably dialkyl with alkyl carbons atoms totaling 16 to 32 per molecule. Dioctyl sodium succinate, didecyl sodium succinate, and their sodium or ammonium salts are especially preferred. For the present purposes, "alkyl carbon atom" means a carbon atom situated within an alkyl ligand of a sulfosuccinate moiety.

The surfactant is preferably present in an amount of about 30 to about 75 weight percent, based on the total weight of the solid surfactant composition; more preferably about 35 to about 65 weight percent; and most preferably about 45 to about 55 weight percent.

The carrier particles are composed of calcium carbonate, calcium silicate, silicon dioxide, kaolin or mixtures of these. The carrier particles should have a mean average particle size of about 0.1 to about 1000 micrometers, preferably about 1 to about 200 micrometers, most preferably about 10 to 160 micrometers. A typical preferred particle size distribution includes 50% of particle below 4 micrometers, 95% of particles below 26 micrometers, and 100% of particles below 56 micrometers.

Carrier particles less than 1 micrometer are not recommended for use in the invention because they cause dusting problems and are sometimes associated with risks to human health. Also, these extremely small particles tend to settle out of mixtures with other solids, rather than distribute homogeneously as is necessary for use in mortar and cement mixtures. Ideally, the solid surfactant composition will be a particulate with the same particle size distribution as a mortar or cement to which it is added.

The carrier particles are preferably present in an amount of about 10 to about 75 weight percent, based on the total weight of the solid surfactant composition; more preferably about 20 to about 60 weight percent; most preferably about 25 to about 55 weight percent. The carrier particles preferably have a capacity for carrying an amount by weight of the surfactant that is about 0.2 to about 5 times the weight of the carrier particles, more preferably about 1 to about 4 times the weight of the carrier particles, most preferably about 1 to about 3 times the weight of the carrier particles.

The carrying capacity of the carrier particles is a key factor for adjusting the rate at which the surfactant dissolves when a solid surfactant composition of the present invention is immersed in water or any other solvent. For chemical operators in general, and construction crews that mix mortar and cement in particular, a relatively rapid dissolution is highly desirable. Dissolution of the surfactant from carrier particle tends to be more rapid from carrier particles that have lower carrying capacity. On the other hand, solid surfactant compositions in which the carrier particles have too low a carrying capacity tend to cake and clump, rather than flow freely.

As set forth above, the carrier particles preferably have a mean average particle size of about 0.1 to about 1000 micrometers and a capacity for carrying an amount by weight of the surfactant that is preferably about 0.2 to about 5 times the weight of the carrier particles. In addition, the inventors have found that suitable carrier calcium carbonate particles in this size range usually have about a specific surface area of about 0.1 to about 15 square meters per gram. Suitable silicon dioxide particles in this size range usually have a specific surface area of about 100 to about 600 square meters per gram. For calcium silicate, suitable carrier particles usually have a specific surface area of about 100 to about 300 square meters per gram. In the case of kaolin, suitable particles usually have specific surface area of up to 20 square meters per gram.

In addition, the solid surfactant composition preferably includes an anticaking agent. For the present purposes, "anticaking agent" means a material that tends to prevent agglomeration of certain solids, thereby promoting flowability of the solids. Without intending to be bound by theory, it is believed that anticaking agents function by adsorbing excess moisture, or by coating particles and making them water repellent. Examples of useful anticaking agents include calcium silicate, silicon dioxide, magnesium oxide, magnesium or calcium stearates, kaolin and bentonites. Some anticaking agents can serve two or more purposes, such as absorbing liquids and promoting flowability. Hydrophobic silicon dioxide is especially preferred as an anticaking agent.

The anticaking agent is preferably present in an amount of about 1 to about 10 weight percent, based on the total weight of the solid surfactant composition; more preferably about 4 to about 8 weight percent.

In another preferred aspect, the invention is a dry-mix, hydraulic-setting mortar or cement composition. The dry-mix position is in powder or granulated form, and includes a hydraulic-setting, dry-mix mortar or cement; a solid surfactant composition as described above; carrier particles as described above; and an anticaking agent as described above. Preferably the solid surfactant composition includes about 0.1 to about 1 wt %, preferably about 0.2 to about 0.8 wt %, and more preferably about 0.3 to about 0.7 wt % of alkyl sulfosuccinates and/or salts of alkyl sulfosuccinates, based on the total weight of the dry-mix composition.

The inventors have discovered that the presence of about 0.1 to about 1 wt %, dioctyl sulfosuccinates, didecyl sulfosucinates, and/or salts of these sulfosuccinates in a dry-mix composition of the invention significantly increases the adhesive strength of a hydraulically-set mortar or cement produced from the dry-mix composition, as compared to hydraulically-set mortar or cement produced from a dry-mix composition that includes no dioctyl sulfosuccinates, no didecyl sulfosucinates, and no salts of these sulfosuccinates ne of these sulfosuccinates but is otherwise identical. Additional information regarding this discovery is provided below in Example 5, Example 6, and Example 7, among other places.

In yet another preferred embodiment, the invention is a process for manufacturing a free-flowing solid surfactant composition. The process includes introducing a surfactant selected from the group consisting of alkyl sulfosuccinates, salts of alkyl sulfosuccinates, and mixtures these sulfosuccinates and/or salts into an absorption zone. The surfactant may be introduced in liquid form, in solid form, or as a solute in a liquid solution. Suitable surfactants are described above with regard to a solid surfactant composition.

Carrier particles are also introduced into the absorption zone. The carrier particles which are composed of an absorbent material selected from the group consisting of calcium carbonate, calcium silicate, silicon dioxide, kaolin, and mixtures thereof; have a mean average particle size of about 0.1 to about 1000 micrometers, and have a capacity for carrying an amount by weight of the surfactant that is about 0.2 to about 5 times the weight of the carrier particles into the absorption zone. Suitable carrier particles are described above with regard to the solid surfactant composition.

The surfactant and the carrier particles are maintained in the absorption zone at conditions effective for absorption of the surfactant by the carrier particles to produce a free-flowing solid surfactant composition. The effective conditions may include mixing, kneading, agitating or spray-drying the surfactant with the carrier particles. Preferably, conditions effective for spray-drying the surfactant with carrier particles are maintained in the absorption zone. Optionally, an anticaking agent, such as hydrophobic silicon dioxide, is introduced into the absorption zone, where it is mixed with the solid surfactant particles to promote flowability.

When conditions effective for spray-drying the surfactant with the carrier particles are maintained in the absorption zone, the surfactant is preferably introduced as a solute in an aqueous solution. A defoamer, a non-ionic surfactant, or both may be blended with the liquid solution. Preferably, a fluidized bed of surfactant solution droplets and carrier particles is maintained in the absorption zone at a temperature that is cool enough to permit absorption of the solution into the carrier particles and warm enough to evaporate the solution the solution at a commercially practical rate. The concentration at which the solution is introduced, the temperature at which the solution is introduced, the relative sizes and amounts of the solution droplets and the carrier particles, and the superficial velocity and inlet temperature of fluidizing gas are factors in determining the effective conditions. These factors and techniques for their optimization are known to practitioners in the art of fluidized bed spray-drying.

When conditions effective for concentrating a liquid surfactant by vacuum drying, rotary evaporator drying, or similar drying techniques are maintained in the absorption zone; the surfactant is preferably introduced as a sulfosuccinate solution or a sulfosuccinate salt solution. The solution is preferably mixed, kneaded, shaken or otherwise agitated with absorbent carrier particles. Additional ingredients, such as a defoaming agent or a non-ionic surfactant, may be introduced into to the absorption zone directly, or introduced into the absorption zone via the sulfosuccinate salt solution. It is possible to produce free-flowing solid surfactant particles without removing all of the solvent from the particles.

In still another preferred aspect, the invention is a process for forming an adhesive bond between a hydraulic-setting, cementitious mortar composition and an article composed of a polymer plastic material. The polymer plastic material may be composed of, for example, expanded polystyrene or extruded polystyrene, and may be incorporated in a system, such as an exterior insulation finishing system.

In the process, a mortar composition is provided that includes a solid surfactant composition as described above. Physical contact is established between the mortar composition and the article composed of a polymer plastic material. This contact is maintained at conditions effective for curing of the mortar composition, thereby forming an improved adhesive bond between the mortar composition and the article. Preferably, the conditions effective for curing the mortar composition include maintaining a temperature warmer than 32 degrees F. for a period of about 1 to about 30 days. The conditions effective for curing of the mortar composition are well known to practitioners in the field of cement and mortar formulation.

The following examples are presented to better communicate the invention, and are not meant to limit the invention in any way. Unless otherwise indicated, all references to parts, percentages or proportions are based on weight.

EXAMPLES

Preparative Example 1

Spray-Drying Sulfosuccinate Salt Solution with Particles

The following procedure (hereinafter referred to as "Procedure 1") is performed for preparing solid formulations of the invention. An aqueous dialkyl sulfosuccinate salt solution is spray dried with carrier particles and/or anti-caking particle in a fluidized bed to produce a free-flowing solid formulation with good caking resistance. For the present purposes, this dialkyl sulfosuccinate salt is referred to as "active ingredient". Optionally, additional ingredients such as surfactants, spray-drying aids or anti-foaming agents may be added to the contents of the fluidized bed in order to modify the physical or chemical properties of the solid formulation. The flow rates and temperatures of the fluidized bed, and of streams entering the fluidized bed, were optimized and maintained by techniques well-known to practitioners in the art of spray-drying. Table 1, below, summarizes the sulfosuccinate salts and particles introduced into the fluidized bed spray drier for specific procedures 1a through 1e, based on the mass of the solid formulations produced by the procedure.

Preparative Example 2

Admixing Sulfosuccinate Salt Solution with Particles

The following procedure (hereinafter referred to as "Procedure 2") is performed for preparing solid formulations of the invention. Particulate solids with a favorable absorption capacity for oleaginous liquids and desirable flow properties are introduced into a mixing or kneading device. A liquid solution including a dialkyl sulfosuccinate or a dialkyl sulfosuccinate salt is added to the particulate solids while mixing, kneading or otherwise agitating the contents of the device proceeds. The liquid solution is absorbed into the absorbent particles to produce free-flowing solid formulations with good caking resistance. Optionally, additional ingredients such as surfactants or anti-foaming agents are added to the

TABLE 1

Preparation of Strength Enhancer by Spray-Drying Solution with Particles

| Procedure No. | Active Ingredient (chemical name) | Active Ingredient (mass % of product) | $CaCO_3$* Particles (mass % of product) | $SiO_2$+ Particles (mass % of product) | Comments |
|---|---|---|---|---|---|
| 1a | Diisodecyl ammonium sulfosuccinate | 37.7 mass % | 54.5 mass % | 7.8 mass % | Product is a free-flowing solid of the INVENTION |
| 1b | Diisodecyl ammonium sulfosuccinate | 38.5 mass % | 57.0 mass % | 4.5 mass % | Product is a free-flowing solid of the INVENTION |
| 1c | Diisooctyl sodium sulfosuccinate | 45.1 mass % | 51.2 mass % | 3.7 mass % | Product is a free-flowing solid of the INVENTION |
| 1d | Diisooctyl sodium sulfosuccinate | 31.8 mass % | 64.8 mass % | 3.4 mass % | Product is a free-flowing solid of the INVENTION |
| 1e | Diisooctyl sodium sulfosuccinate | 53.0 mass % | 43.7 mass % | 3.3 mass % | Product is a free-flowing solid of the INVENTION |

Legend:
*precipitated calcium carbonate particulate commercially available from Omya Hamburg GmbH of Hamburg, Germany under the tradename Omyacarb ®
+hydrophobic precipitated silicon dioxide particulate commercially available from Evonik Degussa Corporation of Wesseling, Germany under the tradename Sipernat ®

The data of Table 1 above demonstrates that free-flowing, solid formulations of the invention can be produced by spray-drying an aqueous dialkyl sulfosuccinate salt solution with carrier particles and/or anti-caking particles in a fluidized bed.

contents of the device in order to modify the physical or chemical properties of the solid formulations. Table 2, below, summarizes the solutions, the absorbent particles, the additional ingredients (if any), and the solid formulations of specific procedures.

TABLE 2

Preparation of Strength Enhancer by Admixing Solution with Particles

| Procedure No. | Active Ingredient (concentration in starting solution) | Active Ingredient (mass % of product) | $CaSiO_3$* Particles (mass % of product) | $SiO_2$+ Particles (mass % of product) | Comments |
|---|---|---|---|---|---|
| 2a | Diisodecyl ammonium sulfosuccinate (50%) | 25 mass % | 0 mass % | 50 mass % | Product contains 25% solvent and is a free-flowing solid of the INVENTION |

TABLE 2-continued

Preparation of Strength Enhancer by Admixing Solution with Particles

| Procedure No. | Active Ingredient (concentration in starting solution) | Active Ingredient (mass % of product) | CaSiO$_3$* Particles (mass % of product) | SiO$_2$+ Particles (mass % of product) | Comments |
|---|---|---|---|---|---|
| 2b | Diisodecyl ammonium sulfosuccinate (60%) | 30 mass % | 0 mass % | 50 mass % | Product contains 20% solvent and is a free-flowing solid of the INVENTION |
| 2c | Diisooctyl sodium sulfosuccinate (70%) | 40 mass % | 42 mass % | 0 mass % | Product contains 18% solvent and is a free-flowing solid of the INVENTION |

Legend:
*precipitated calcium silicate particulate commercially available from J. M. Huber Corporation of Oostende, Belgium under the tradename Zeofree ®
+hydrophobic precipitated silicon dioxide particulate commercially available from Evonik Degussa Corporation of Wesseling, Germany under the tradename Sipernat ®

The data of Table 2 above demonstrates that free-flowing, solid formulations of the invention can be produced by admixing an aqueous dialkyl sulfosuccinate salt solution in liquid for with absorbent carrier particles and/or absorbent anti-caking particles.

Preparative Example 3

Blending Dried Dialkyl Sulfosuccinate Salt with Particles

The following procedure (hereinafter referred to as "Procedure 3") is performed to prepare solid formulations of the invention. A dialkyl sulfosuccinate salt solution is dried to produce a wax-like solid, comminuted as necessary, and blended with particles having desirable flow properties to produce a free-flowing solid formulation with good caking resistance. Optionally, additional ingredients such as surfactants or anti-foaming agents are added to the contents of the mixer in order to modify the physical or chemical properties of the solid formulation. Table 3, below, summarizes the dried dialkyl sulfosuccinate salts, the particles, the additional ingredients (if any), and the solid formulations produced by specific procedures.

TABLE 3

Preparation of Strength Enhancer by Blending Dried Salt with Particles

| Procedure No. | Active Ingredient/ (mass % of product) | Kaolin⁻ Particles (mass % of product) | CaCO$_3$* Particles (mass % of product) | SiO$_2$+ Particles (mass % of product) | Comments |
|---|---|---|---|---|---|
| 3b | Diisodecyl ammonium sulfosuccinate/ 66 mass % | 0 mass % | 34 mass % | 0 mass % | Product is a free-flowing solid of the INVENTION |
| 3c | Diisodecyl ammonium sulfosuccinate/ 37 mass % | 0 mass % | 55 mass % | 8 mass % | Product is a free-flowing solid of the INVENTION |
| 3d | Diisooctyl sodium sulfosuccinate/ 50 mass % | 0 mass % | 0 mass % | 50 mass % | Product is a free-flowing solid of the INVENTION |
| 3e | Diisooctyl sodium sulfosuccinate/ 66 mass % | 0 mass % | 34 mass % | 0 mass % | Product is a free-flowing solid of the INVENTION |
| 3f | Diisooctyl sodium sulfosuccinate 60 mass % | 0 mass % | 35 mass % | 5 mass % | Product is a free-flowing solid of the INVENTION |

TABLE 3-continued

Preparation of Strength Enhancer by Blending Dried Salt with Particles

| Procedure No. | Active Ingredient/ (mass % of product) | Kaolin[−] Particles (mass % of product) | CaCO$_3$* Particles (mass % of product) | SiO$_2$[+] Particles (mass % of product) | Comments |
|---|---|---|---|---|---|
| 3g | Diisooctyl sodium sulfosuccinate/ 50 mass % | 50 mass % | 0 mass % | 0 mass % | Product is a free-flowing solid of the INVENTION |

Legend:
[−]hydrated aluminium silicate particulate commercially available from KaMin LLC of Macon, Georgia, U.S.A. under the tradename KaMin ™ 90
*precipitated calcium carbonate particulate commercially available from Omya Hamburg GmbH of Hamburg, Germany under the tradename Omycarb ®
[+]hydrophobic precipitated or fumed silicon dioxide particulate commercially available from Evonik Degussa Corporation of Wesseling, Germany under the tradenames Sipernat ® and Aerosil ®

The data of Table 3 above demonstrates that free-flowing, solid formulations of the invention can be produced by blending a dried dialkyl sulfosuccinate salt solution in solid form with carrier particles and/or anti-caking particles.

Performance Example 4

Testing of Spray-Dried Adhesive Bond Strength Enhancers

The following performance testing procedure (hereinafter referred to as "the Testing Procedure") is performed in order to determine the effect of an adhesive bond strength enhancer on an adhesive bond between a cement composition and a board composed of expanded or extruded polystyrene. In the procedure, solid strength enhancers are pre-mixed for about one minute with a dry cement composition. In either case, the cement composition is selected from mineral adhesive and reinforcement mortars, such as "BAUMIT Adhesivefiller ("Klebespachtel")™" and "BAUMIT Adhesivefiller Allround ("Klebespachtel Allround")™", which are commercially available from Baumit. The mineral mortar is added to water in a ratio of 4 to 1 and mixed for one minute. In each trial, an active concentration use level of 0.3 to 0.6 mass % dialkyl sulfosuccinate salt is utilized.

A 2 to 3 mm wet mortar layer is applied evenly on an expanded or extruded polystyrene board, such as an extruded XPS polystyrene board commercially available form BASF under the tradename "Styrodur 3035 CS." The wet mortar test specimens are dried over a period of 7, 14 or alternatively 28 days. At the end of the drying period, the adhesive strength of the bond between the mortar and the expanded polystyrene board is measured in accordance with test protocol DIN EN ISO 4624:2003. A pull-off adhesion tester is employed in the protocol. Each of the tests is conducted in general 6 to 10 times with a strength enhancer of interest, and the same number of times without any strength enhancer for comparison. An adhesion enhancement value (in units of percentage increase) is calculated by dividing the mean average of results for each test with strength enhancer by the mean average of test results without strength enhancer, subtracting one, and multiplying the difference times 100.

Employing the Testing Procedure, adhesion enhancement values are determined for various spray-dried dialkyl sulfosuccinate salts and presented in Table 4, below.

TABLE 4

Adhesion Increase for Spray-Dried Dialkyl Sulfosuccinate Salts in Mineral Mortar on Polystyrene Boards

| Test No. | Strength Enhancer (active content of solid form) | Mineral Mortar Product Name (Producer) | XPS or EPS (Producer/ Board Name) | Dry Time | Active Use-Level | Adhesion Increase[1] (percent) |
|---|---|---|---|---|---|---|
| 4a | DDSS[2] (38%) | Klebespachtel Allround (Baumit[4]) | XPS (BASF/ 3035 CS) | 28 days | 0.5% | +42% |
| 4b | DOSS[3] (45%) | Klebespachtel Allround (Baumit) | XPS (BASF/ 3035 CS) | 28 days | 0.5% | +48% |
| 4c | DOSS (45%) | Klebespachtel Allround (Baumit) | XPS (Dow/Austrotherm Top P) | 14 days | 0.5% | +65% |
| 4d | DOSS (45%) | STOlevell Uni (Sto[5]) | EPS (Sto/ PS30SE) | 28 days | 0.4%-0.5% | +44% |
| 4e | DOSS (45%) | STOlevell Uni (Sto) | XPS (BASF/ 3035 CS) | 28 days | 0.4% | +78% |
| 4f | DOSS (45%) | Capatect (DAW[6]) | XPS (BASF/3035 CS) | 28 days | 0.5% | +58% |
| 4g | DOSS (45%) | Combi Putz 499 (Greutol[7]) | EPS (Greutol) | 7 days | 0.5% | +11% |

TABLE 4-continued

Adhesion Increase for Spray-Dried Dialkyl Sulfosuccinate
Salts in Mineral Mortar on Polystyrene Boards

| Test No. | Strength Enhancer (active content of solid form) | Mineral Mortar Product Name (Producer) | XPS or EPS (Producer/ Board Name) | Dry Time | Active Use-Level | Adhesion Increase[1] (percent) |
|---|---|---|---|---|---|---|
| 4h | DOSS (45%) | Combi Putz 499 (Greutol) | XPS (BASF/ 3035 CS) | 7 days | 0.5% | +34% |
| 4i | DOSS (45%) | Klebespachtel (Quarzolith[8]) | XPS (BASF/ 3035 CS) | 7 days | 0.5% | +9% |
| 4k | DOSS (45%) | Klebespachtel (St. Gobain[9]) | XPS (Weber-Terranova) | 28 days | 0.3% | +30% |
| 4l | DOSS (45%) | WDVS Pulverkleber 3550 (Brillux[10]) | XPS (BASF/ 3035 CS) | 14 days | 0.5% | +62% |
| 4m | DOSS (45%) | Klebemörtel 804 (Hasit[11]) | XPS (BASF/ 3035 CS) | 14 days | 0.6% | +54% |

Legend:
[1] Adhesion Increase is calculated by dividing the mean average of test runs with sulfosuccinate-containing mortar by the mean average of test runs having no sulfosuccinate, and expressing the quotient as a percentage.
[2] DDSS means diisodecyl ammonium sulfosuccinate in solid form, of 38% active content, produced by the spray-drying process described above in Example 1.
[3] DOSS means diisooctyl sodium sulfosuccinate in solid form, of 45% active content, produced by the spray-drying process described above in Example 1.
[4] Baumit means Wietersdorfer & Peggauer Zementwerke GmbH, A-9373 Klein, St. Paul
[5] Sto means STO AG, Ehrenbachstraβe, 1 D-79780 Stühlingen
[6] DAW means Synthesa Chemie Ges. m.b.H, Dirnbergerstraβe 29-31, A-4320 Perg
[7] Greutol means Greutol AG, Libernstraβe 28, CH-8112 Otelfingen
[8] Quarzolith means Quarzolith Süd GmbH, Mitterdorferstraβe 1, A-8572 Bärnbach
[9] St. Gobain means Saint Gobain, Weber Maxit, Gleichentheilgasse 6, A-1230 Wien
[10] Brillux means Brillux GmbH & Co. KG, Weseler Straβe 401, D-48163 Münster
[11] Hasit means Hasit Trockenmörtel GmbH, Karl-Knab-Straβe 44, D-92521 Schwarzenfeld Inspection of Table 4 above reveals that diisodecyl sodium sulfosuccinate in solid form of 38% active content, and diisooctyl sodium sulfosuccinate in solid form of 45% active content, produced by the spray-drying process described above in Example 1 significantly increase the strength of an adhesive bond between a polystyrene board and a variety of commercially available mineral mortar products.

Performance Example 5

Testing of Spray-Dried Adhesive Bond Strength Enhancers

In order to determine the effect of use-level on adhesive strength, the Testing Procedure described above in Example 4 is performed for various use-levels of a particular spray-dried solid surfactant composition in a certain mineral mortar on identical polystyrene boards.

In the procedure, a solid surfactant composition produced by spray-drying an aqueous solution of dioctyl sulfosuccinate salt with a calcium carbonate carrier is pre-mixed for about a minute with a dry-mix, hydraulically-setting, cementitious mineral mortar composition that is commercially available under the trade name "BAUMIT Adhesivefiller Allround™" from Baumit. The mineral mortar is added to water in a ratio of 4 to 1 and mixed for one minute. In each trial, an active concentration use-level in the range of 0.1 to 0.8 mass % of dioctyl sulfosuccinate salt is utilized.

A 2 to 3 mm wet mortar layer is applied evenly on an extruded polystyrene board commercially available from Dow under the trade name Austrotherm Top P. The wet mortar test specimens are dried over a period of 7 days. At the end of the drying period, the adhesive strength of the bond between the mortar and the extruded polystyrene board is measured in accordance with test protocol DIN EN ISO 4624:2003 using a pull-off adhesion tester. An adhesion enhancement value (in units of percentage increase) is calculated by dividing the mean average of results for each test with strength enhancer by the mean average of test results without strength enhancer, subtracting one, and multiplying the difference times 100.

Employing the Testing Procedure, adhesion enhancement values are determined for a various use-levels of a particular spray-dried dioctyl sulfosuccinatesalt in a certain mineral mortar on identical polystyrene boards and presented in Table 5, below.

TABLE 5

Adhesion Increase for Various Use-Levels of Spray-Dried Dioctyl
Sulfosuccinate Salt in a Mineral Mortar on a Polystyrene Board

| Test No. | Strength Enhancer (active content of solid form) | Mineral Mortar Product Name (Producer) | XPS (Producer/ Board Name) | Dry Time | Active Use-Level | Adhesion Increase[1] (percent) |
|---|---|---|---|---|---|---|
| 5a | DOSS[2] (45%) | Klebespachtel Allround (Baumit[3]) | XPS (Dow/Austrotherm Top P) | 7 days | 0.1% | +4% |

TABLE 5-continued

Adhesion Increase for Various Use-Levels of Spray-Dried Dioctyl Sulfosuccinate Salt in a Mineral Mortar on a Polystyrene Board

| Test No. | Strength Enhancer (active content of solid form) | Mineral Mortar Product Name (Producer) | XPS (Producer/ Board Name) | Dry Time | Active Use-Level | Adhesion Increase[1] (percent) |
|---|---|---|---|---|---|---|
| 5b | DOSS (45%) | Klebespachtel Allround (Baumit) | XPS (Dow/Austro-therm Top P) | 7 days | 0.2% | +38% |
| 5c | DOSS (45%) | Klebespachtel Allround (Baumit) | XPS (Dow/Austro-therm Top P) | 7 days | 0.3% | +44% |
| 5d | DOSS (45%) | Klebespachtel Allround (Baumit) | XPS (Dow/Austro-therm Top P) | 7 days | 0.4% | +46% |
| 5e | DOSS (45%) | Klebespachtel Allround (Baumit) | XPS (Dow/Austro-therm Top P) | 7 days | 0.5% | +51% |
| 5f | DOSS (45%) | Klebespachtel Allround (Baumit) | XPS (Dow/Austro-therm Top P) | 7 days | 0.6% | +43% |
| 5g | DOSS (45%) | Klebespachtel Allround (Baumit) | XPS (Dow/Austro-therm Top P) | 7 days | 0.7% | +35% |
| 5h | DOSS (45%) | Klebespachtel Allround (Baumit) | XPS (Dow/Austro-therm Top P) | 7 days | 0.8% | +22% |

Legend:
[1] Adhesion Increase is calculated by dividing the mean average of test runs with sulfosuccinate-containing mortar by the mean average of test runs having no sulfosuccinate, and expressing the quotient as a percentage.
[2] DOSS means diisooctyl sodium sulfosuccinate in solid form, of 45% active content, produced by the spray-drying process described above in Example 1.
[3] Baumit means Wietersdorfer & Peggauer Zementwerke GmbH, A-9373 Klein, St. Paul Inspection of Table 5 above reveals that addition of dioctyl sulfosuccinate salt in solid form, in the range of 0.22 to 1.78 mass % Strength Enhancer use-level, significantly increases the strength of an adhesive bond between a polystyrene board and a commercially available dry-mix mineral mortar product. Based on this data, it appears that an anomaly for adhesive strength enhancement exists in the range of about 0.1 to about 1 mass % active use-level.

Performance Example 6

Performance Testing of Admixed Bond Strength Enhancers

The Testing Procedure described above in Example 4 is performed with a free flowing, solid adhesive bond strength enhancing composition prepared by the process described in above in Example 2 in order to determine the effect of these compositions on an adhesive bond between a cementitious composition and a board composed of extruded polystyrene. Employing the Testing Procedure at two different use levels of a dialkyl sulfosuccinate salt, adhesion enhancement values are measured and presented in Table 6 below.

TABLE 6

Adhesion Increase for Admixed Dialkyl Sulfosuccinate Salts in Mineral Mortar on Polystyrene Boards

| Test No. | Strength Enhancer (mass %)/ Particles | Mineral Mortar Product Name (Producer) | XPS or EPS (Producer/ Board Name) | Dry Time | Active Use-Level | Adhesion Increase[1] (percent) |
|---|---|---|---|---|---|---|
| 6a | DDSS[2] (25%)/ SiO$_2$+ | Klebespachtel Allround (Baumit[4]) | XPS (BASF/ 3035 CS) | 7 days | 0.5% | +27% |
| 6b | DDSS (25%)/ SiO$_2$+ | Klebespachtel Allround (Baumit) | XPS (BASF/ 3035 CS) | 28 days | 0.5% | +32% |
| 6c | DDSS (30%)/ SiO$_2$+ | Klebespachtel Allround (Baumit) | XPS (BASF/ 3035 CS) | 7 days | 0.5% | +26% |
| 6d | DDSS (30%)/ SiO$_2$+ | Klebespachtel Allround (Baumit) | XPS (BASF/ 3035 CS) | 28 days | 0.5% | +28% |
| 6e | DOSS[3] (40%)/CaSiO$_3$* | Klebespachtel Allround (Baumit[3]) | XPS (BASF/ 3035 CS) | 14 days | 0.5% | +10% |

TABLE 6-continued

Adhesion Increase for Admixed Dialkyl Sulfosuccinate
Salts in Mineral Mortar on Polystyrene Boards

| Test No. | Strength Enhancer (mass %)/ Particles | Mineral Mortar Product Name (Producer) | XPS or EPS (Producer/ Board Name) | Dry Time | Active Use-Level | Adhesion Increase[1] (percent) |
|---|---|---|---|---|---|---|
| 6f | DOSS (40%)/CaSiO$_3$* | Klebespachtel Allround (Baumit) | XPS (BASF/ 3035 CS) | 14 days | 0.6% | +35% |

Legend:
[1]Adhesion Increase is calculated by dividing the mean average of test runs with sulfosuccinate-containing mortar by the mean average of test runs having no sulfosuccinate, and expressing the quotient as a percentage.
[2]DDSS means diisodecyl ammonium sulfosuccinate in solid form, of 25 or 30% active content, produced by admixing of a sulfosuccinate salt solution with absorbent particulate as described above in Example 2.
[3]DOSS means diisooctyl sodium sulfosuccinate in solid form, of 40% active content, produced by admixing of a sulfosuccinate salt solution with absorbent particulate as described above in Example 2.
[4]Baumit means Wietersdorfer & Peggauer Zementwerke GmbH, A-9373 Klein, St. Paul
+hydrophobic precipitated silicon dioxide particulate commercially available from Evonik Degussa Corporation of Wesseling, Germany under the tradename Sipernat ®
*precipitated calcium silicate particulate commercially available from J. M. Huber Corporation of Oostende, Belgium under the tradename Zeofree ®

The results presented in Table 6 are proof that a dry, free-flowing, solid composition prepared by the admixture process described above in Example 2 significantly increases the strength of an adhesive bond between a polystyrene board and a commercially available mineral mortar product.

Performance Example 7
Testing of Dried Sulfosuccinate Salts Blended with Particulate Various dried dialkyl sulfosuccinate salts are blended with solid carrier materials in accordance with Procedure 3, which is described above in Preparative Example 3. Adhesion enhancement values are determined for the dried dialkyl sulfosuccinate salts with solid carrier materials in accordance with the Testing Procedure, as set forth above in Example 6. In each trial, an active concentration of 0.5 mass % dried dialkyl sulfosuccinate salt is utilized. The resulting adhesion enhancement values are presented in Table 7 below.

TABLE 7

Adhesion Increase for Dried Dialkyl Sulfosuccinate Salt
with Particles in Mineral Mortar on Polystyrene Boards

| Test No. | Strength Enhancer (mass %)/ Particle (mass %) | Mineral Mortar Product Name (Producer) | XPS or EPS (Producer/ Board Name) | Dry Time | Active Use-Level | Adhesion Increase[1] (percent) |
|---|---|---|---|---|---|---|
| 7a | DDSS[2] (66%)/ CaCO$_3$* (34%) | Klebespachtel Allround (Baumit[4]) | XPS (BASF/ 3035 CS) | 7 days | 0.5% | +37% |
| 7b | DDSS (66%)/ CaCO$_3$* (34%) | Klebespachtel Allround (Baumit) | XPS (BASF/ 3035 CS) | 28 days | 0.5% | +30% |
| 7c | DOSS[3] (66%)/ CaCO$_3$* (34%) | Klebespachtel Allround (Baumit) | XPS (BASF/ 3035 CS) | 7 days | 0.5% | +49% |
| 7d | DOSS (66%)/ CaCO$_3$* (34%) | Klebespachtel Allround (Baumit) | XPS (BASF/ 3035 CS) | 28 days | 0.5% | +37% |
| 7e | DOSS (50%)/ Kaolin clay** (50%) | Klebespachtel Allround (Baumit) | XPS (BASF/ 3035 CS) | 7 days | 0.5% | +23% |
| 7f | DOSS (50%)/SiO$_2$*** (50%) | Klebespachtel Allround (Baumit) | XPS (BASF/ 3035 CS) | 7 days | 0.5% | +16% |

Legend:
[1]Adhesion Increase is calculated by dividing the mean average of test runs with sulfosuccinate-containing mortar by the mean average of test runs having no sulfosuccinate, and expressing the quotient as a percentage.
[2]DDSS means diisodecyl ammonium sulfosuccinate in solid form, produced by blending dried diisodecyl ammonium sulfosuccinate with particulate as described above in Example 3.
[3]DOSS means diisooctyl sodium sulfosuccinate in solid form, produced by blending dried diisooctyl sodium sulfosuccinate with particulate as described above in Example 3.
[4]Baumit means Wietersdorfer & Peggauer Zementwerke GmbH, A-9373 Klein, St. Paul
*precipitated calcium carbonate particulate commercially available from Omya Hamburg GmbH of Hamburg, Germany under the tradename Omyacarb ®

TABLE 7-continued

Adhesion Increase for Dried Dialkyl Sulfosuccinate Salt
with Particles in Mineral Mortar on Polystyrene Boards

| Test No. | Strength Enhancer (mass %)/ Particle (mass %) | Mineral Mortar Product Name (Producer) | XPS or EPS (Producer/ Board Name) | Dry Time | Active Use-Level | Adhesion Increase[1] (percent) |
| --- | --- | --- | --- | --- | --- | --- |

**hydrated aluminium silicate particulate commercially available from KaMin LLC of Macon, Georgia, U.S.A. under the tradename KaMin ™
***hydrophobic fumed silicon dioxide particulate commercially available from Evonik Degussa Corporation of Wesseling, Germany under the tradename Aerosil ®

Based on the results presented above in Table 7, one may reasonably conclude that the presence of dry, free-flowing, solid compositions prepared by the dry blending process described above in Example 3 significantly increases the strength of an adhesive bond between a polystyrene board and a commercially available mineral mortar product.

Performance Example 8

Deaerating Effect of Spray-Dried Dioctyl Sulfosuccinate Salt

A solid surfactant composition that contains 45% diisooctyl sulfosuccinate salt prepared in accordance with Procedure 1, set forth above in Preparative Example 1. In various demonstration tests, the solid surfactant composition is mixed at known concentrations for one minute with a mineral mortar and water that are present in a proportion of 4:1, and the volume of the mixture is measured. The volumes are set forth below in Table 8.

TABLE 8

Mineral Mortar Volume

| Test No. | Strength Enhancer Active Ingredient (mass %) | Mineral Mortar Product Name (Producer) | Active use-level (percent in mixture) | Volume (milliters) |
| --- | --- | --- | --- | --- |
| 8a | DOSS[1] (45%) | Klebespachtel Allround (Baumit[2]) | 0.000% (Control) | 61 ml |
| 8b | DOSS (45%) | Klebespachtel Allround (Baumit) | 0.010% | 63 ml |
| 8c | DOSS (45%) | Klebespachtel Allround (Baumit) | 0.025% | 54 ml |
| 8d | DOSS (45%) | Klebespachtel Allround (Baumit) | 0.050% | 54 ml |
| 8e | DOSS (45%) | Klebespachtel Allround (Baumit) | 0.075% | 53 ml |
| 8f | DOSS (45%) | Klebespachtel Allround (Baumit) | 0.100% | 53 ml |
| 8g | DOSS (45%) | Klebespachtel Allround (Baumit) | 0.250% | 52 ml |
| 8h | DOSS (45%) | Klebespachtel Allround (Baumit) | 0.500% | 51 ml |

Legend:
[1]DOSS means diisooctyl sodium sulfosuccinate in solid form, of 45% active content, produced by the spray-drying process described above in Example 1.
[2]Baumit means Wietersdorfer & Peggauer Zementwerke GmbH, A-9373 Klein, St. Paul The results presented above in Table 8 indicate that a solid surfactant composition of the invention acts as a deaerating agent upon mixing with a commercially available mineral mortar and water. In fact, the concentration of diisooctyl sulfosuccinate in the mixture is directly proportional to the deaeration.

The above Examples are intended to better communicate the invention, and do not limit the invention in any way. The invention is defined solely by the appended claims.

What is claimed is:
1. A free-flowing solid surfactant composition comprising:
  a) about 30 to about 75 weight percent of a surfactant selected from the group consisting of alkyl sulfosuccinates, salts of alkyl sulfosuccinates, and mixtures thereof; and
  b) carrier particles composed of an absorbent material selected from the group consisting of calcium carbonate, calcium silicate, silicon dioxide, kaolin, and mixtures thereof; which carrier particles have a mean average particle size of about 0.1 to about 1000 micrometers and a capacity for carrying an amount by weight of the surfactant that is about 0.2 to about 5 times the weight of the carrier particles.

2. The surfactant composition of claim 1 in which the surfactant is selected from the group consisting of dialkyl sulfosuccinates, salts of dialkyl sulfosuccinates, and mixtures thereof.

3. The surfactant composition of claim 1 in which the surfactant is selected from the group consisting of alkyl sulfosuccinates that each have a total of about 16 to about 32 alkyl carbon atoms per molecule, salts of alkyl sulfosuccinates that each have a total of about 16 to about 32 alkyl carbon atoms per molecule, and mixtures thereof.

4. The surfactant composition of claim 1 in which the carrier particles have a mean average particle size of about 1 to about 200 micrometers and a capacity for carrying an amount by weight of the surfactant that is about 0.5 to about 4 times the weight of the carrier particles.

5. The surfactant composition of claim 1 in which the carrier particles are composed of calcium carbonate and have a specific surface area of about 0.1 to about 15 square meters per gram.

6. A free-flowing solid surfactant composition comprising:
  a) about 30 to about 75 weight percent of a surfactant selected from the group consisting of alkyl sulfosuccinates, salts of dialkyl sulfosuccinates, and mixtures thereof;
  b) about 10 to about 75 weight percent of carrier particles composed of an absorbent material selected from the group consisting of calcium carbonate, calcium silicate, silicon dioxide, kaolin, and mixtures thereof, which carrier particles have a mean average particle size of about 10 to about 160 micrometers and a capacity to absorb an amount by weight of the surfactant that is about 0.2 to about 4 times the weight of the carrier particles; and c) about 1 to about 10 weight percent of an anticaking agent.

7. The composition of claim 6, in which the anticaking agent is composed of hydrophobic silicon dioxide.

8. A dry-mix mortar composition which comprises:
mortar;
a solid surfactant composition comprising:
   a) about 30 to about 75 weight percent of a surfactant selected from the group consisting of alkyl sulfosuccinates, salts of alkyl sulfosuccinates, and mixtures thereof;
   b) carrier particles composed of an absorbent material selected from the group consisting of calcium carbonate, calcium silicate, silicon dioxide, kaolin, and mixtures thereof; which carrier particles have a mean average particle size of about 0.1 to about 1000 micrometers and a capacity for carrying an amount by weight of the surfactant that is about 0.2 to about 5 times the weight of the carrier particles; and
   c) an anticaking agent.

9. The dry-mix composition of claim 8 in which the surfactant is selected from the group consisting of dialkyl sulfosuccinates that each have a total of about 16 to about 32 alkyl carbon atoms per molecule, salts of dialkyl sulfosuccinates that each have a total of about 16 to about 32 alkyl carbon atoms per molecule, and mixtures thereof.

10. The solid surfactant composition of claim 9 in which the surfactant is about 0.1 to about 1 wt %, based on the total weight of the dry-mix composition.

11. A process for manufacturing a free-flowing solid surfactant composition, which process comprises:
   introducing into an absorption zone a surfactant selected from the group consisting of alkyl sulfosuccinates, salts of alkyl sulfosuccinates, and mixtures thereof;
   introducing into the absorption zone carrier particles composed of an absorbent material selected from the group consisting of calcium carbonate, calcium silicate, silicon dioxide, kaolin, and mixtures thereof; which carrier particle have a mean average particle size of about 0.1 to about 1000 micrometers and a capacity for carrying an amount by weight of the surfactant that is about 0.2 to about 5 times the weight of the carrier particles; and
   maintaining the surfactant and the carrier particles in the absorption zone at conditions effective for absorption of the surfactant by the carrier particles to produce a free-flowing solid surfactant composition including about 30 to about 75 weight percent of the surfactant.

12. The process of claim 11 which includes introducing into the absortion zone an anticaking agent.

13. The process of claim 11 in which the effective conditions include mixing, kneading, agitating or spray-drying the surfactant and the carrier particles.

14. The process of claim 13 in which the effective conditions include spray-drying the surfactant and the carrier particles.

15. The process of claim 11 in which the anticaking agent is hydrophobic silicon dioxide.

16. The process of claim 11 which includes concentrating the liquid by vacuum drying or rotary evaporator drying.

17. The process of claim 11 which includes blending a defoamer with the solid surfactant composition and/or the carrier particles.

18. The process of claim 11 which includes blending a non-ionic surfactant with the solid surfactant composition and/or the absorbent particles.

19. A process for manufacturing a free-flowing solid surfactant composition, which process comprises:
   spray-drying a liquid solution including a surfactant selected from the group of dialkyl sulfosuccinates, salts of dialkyl sulfosuccinates, and mixtures thereof in the presence of carrier particles composed of an absorbent material selected from the group consisting of calcium carbonate, calcium silicate silicon dioxide kaolin and mixtures thereof which carrier particles have a mean average particle size of about 0.1 to about 1000 micrometers and a capacity for carrying an amount by weight of the surfactant that is about 0.2 to about 5 times the weight of the carrier particles; to produce a free-flowing solid surfactant composition including about 30 to about 75 weight percent of the surfactant.

20. The process of claim 19 in which the carrier particles are composed of an absorbent material selected from the group consisting of calcium carbonate, calcium silicate, silicon dioxide, kaolin, and mixtures thereof; and have a mean average particle size of about 0.1 to about 1000 micrometers.

21. The process of claim 19 which includes blending a defoamer with the liquid solution.

22. The process of claim 19 which includes blending a non-ionic surfactant with the liquid solution.

23. The surfactant composition of claim 1 in which the surfactant is about 35 to about 75 weight percent, based on the total weight of the surfactant composition.

24. The surfactant composition of claim 1 in which the surfactant is about 45 to about 75 weight percent, based on the total weight of the surfactant composition.

* * * * *